(12) United States Patent
Yu

(10) Patent No.: US 8,098,444 B2
(45) Date of Patent: Jan. 17, 2012

(54) CLUTCHING JIG

(75) Inventor: Sheng-Nan Yu, Taipei (TW)

(73) Assignee: Cheng Uei Precision Industry Co., Ltd., Taipei (TW)

( * ) Notice: Subject to any disclaimer, the term of this patent is extended or adjusted under 35 U.S.C. 154(b) by 0 days.

(21) Appl. No.: 12/760,343

(22) Filed: Apr. 14, 2010

(65) Prior Publication Data

US 2011/0255180 A1  Oct. 20, 2011

(51) Int. Cl.
*G02B 27/00* (2006.01)
*G02B 3/00* (2006.01)
*G02B 7/00* (2006.01)

(52) U.S. Cl. ....................... 359/809; 359/819

(58) Field of Classification Search .................. 359/809, 359/827, 819; 29/566, 564, 741
See application file for complete search history.

(56) References Cited

U.S. PATENT DOCUMENTS

2011/0051263 A1* 3/2011 Wang et al. .................. 359/809
* cited by examiner

*Primary Examiner* — Alicia M Harrington
(74) *Attorney, Agent, or Firm* — WPAT, P.C.; Anthony King

(57) ABSTRACT

A clutching jig has a pair of holding arms which has upper ends connected together, and lower ends spaced away from each other. An inner surface of each holding arm has a through mounting hole of substantially ellipse shape, for allowing a connecting pole passing therethrough and moving therein. A trough is formed at a lower surface of each holding arm and passing through the corresponding inner surface. Two sliding elements are slidably mounted to the holding arms respectively, each of which has a basic plate. The basic plate has a though hole at an upper portion thereof, for engaging with the connecting pole. Two resisting pads are disposed between outer surfaces of the holding arms and the basic plates. Each of the resisting pads has a hole at an upper portion thereof, for engaging with the connecting pole.

5 Claims, 5 Drawing Sheets

US 8,098,444 B2

CLUTCHING JIG

BACKGROUND OF THE INVENTION

1. Field of the Invention

The invention relates to a clutching jig, and more particularly to a clutching jig for conveniently disassembling a lens component from a lens socket.

2. The Related Art

Please refer to FIG. 6, a conventional lens module includes a lens component 300 and a lens socket 200 receiving the lens component 300. The lens component 300 has a rectangular lens base 301 and a round lens body 302 disposed on the lens base 301. The lens body 302 has a fool-proof projection 303 extended outwards from a side thereof. The lens socket 200 has an insulating housing 201 and a metal shell 202 enclosing a periphery of the insulating housing 201. The metal shell 202 is provided with a plurality of buckling pieces 203 at upper portions thereof. The buckling pieces 203 are bent inwards to abut against a top of the lens base 301 for preventing the lens component 300 from removing out of the lens socket 200.

A clutching jig 100', which is capable of disassembling the lens component 300 from the lens socket 200, has a rectangular base 1', with a first end and a second end defined thereon. The first end has a slot 4' extending towards the second end. The slot 4' passes through a pair of opposite sides of the base 1' to form a first holding arm 2', a second holding arm 3'. The first end has a receiving trough 12' for receiving the lens component 300. The slot 4' is substantially located in a center of the receiving trough 12'. A wall of the receiving trough 12' is formed with a fool-proof groove 13' for guiding the receiving trough 12' to hold the lens body 302 properly. The two opposite sides of the base 1', where the slot 4' passes, extend beyond the first end to form a pair of inserting slices 11'. The inserting slices 11' rest against the buckling pieces 203 to disengage from the lens base 301 when the receiving trough 12' receives the lens body 302. The first holding arm 2' and the second holding arm 3' are forced to approach each other to hold the lens body 302 to depart from the lens socket 200. However, the inserting slices 11' are liable to deform when subjected to the unexpected force, because the inserting slices 11' are thin and weak. As a result, the clutching jig 100' fails to disassemble the lens body 302 from the lens base 301 efficiently, and could not be used for a along time.

SUMMARY OF THE INVENTION

An object of the present invention is to provide a clutching jig. The clutching jig is used to disassemble a lens socket and a lens component which is fixed in the lens socket by a plurality of buckling pieces of the lens socket abutting on the lens component. The clutching jig has a pair of holding arms defining two facing inner surfaces and two outer surfaces opposite to the corresponding inner surfaces. The holding arms have upper ends connected together, and lower ends spaced away from each other to form an interstice. Each of the inner surfaces has a mounting hole of substantially ellipse shape reaching the outer surface, for allowing a connecting pole passing therethrough and moving therein. A trough is formed at a lower surface of each holding arm and passes through the corresponding inner surface, for surrounding a space to receive the lens component. Two sliding elements are slidably mounted to the holding arms respectively. Each of the sliding elements has a basic plate. The basic plate has a though hole at an upper portion thereof, for engaging with the connecting pole. Two resisting pads are disposed between the outer surfaces of the holding arms and the basic plates. Each of the resisting pads has a hole at an upper portion thereof, for engaging with the connecting pole. The sliding elements are located at a first position where lower edges of the resisting pads are substantially flush with the lower surfaces of the holding arms, and moved downwards to a second position with respect to the holding arms where the lower edges of the resisting pads project beyond the lower surfaces of the holding arms with a predetermined distance to insert a space between the lens component and the lens socket for pressing the buckling pieces to disengage from the lens component.

As described above, when the clutching jig is unused, the resisting pads are attached to the holding arms, with the lower edges unextended beyond the lower surfaces of the holding arms, which is capable of preventing the resisting pads from deforming in the action of the unexpected force. When the clutching jig is in use, the resisting pads are moved along the holding arms to project beyond the lower surface of the holding arms with a short distance, which pushes the buckling piece to depart from the lens component, but is not affected to deform by the force from the buckling pieces. Furthermore, the exposed portions of the resisting pads are inserted between the lens socket and the lens component, which is effective to restrain the resisting pads from deforming.

BRIEF DESCRIPTION OF THE DRAWINGS

The present invention will be apparent to those skilled in the art by reading the following description thereof, with reference to the attached drawings, in which.

DETAILED DESCRIPTION OF THE EMBODIMENT

Figure 1:
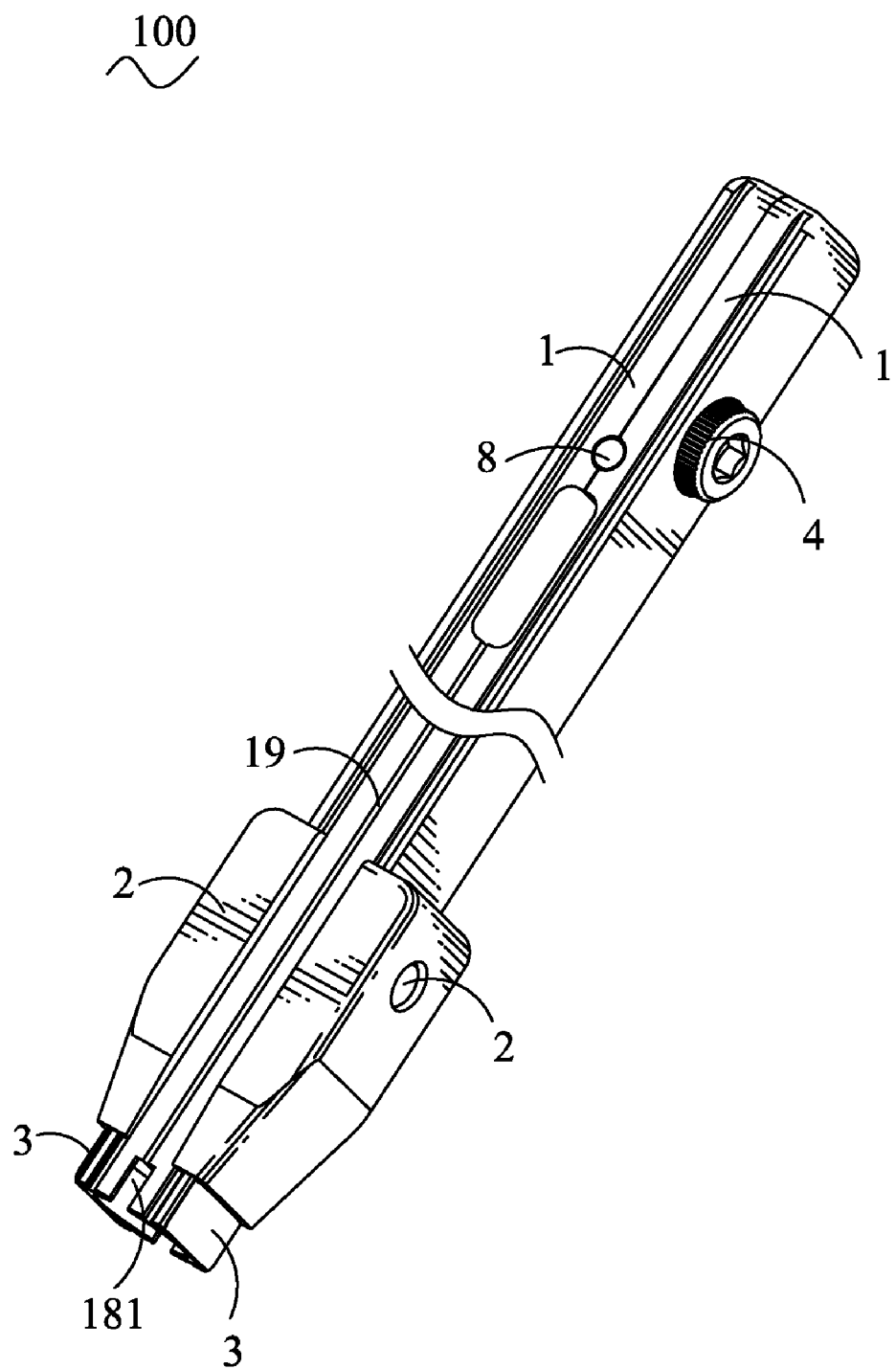
FIG. 1 is an assembled, perspective view of a clutching jig of an embodiment according to the present invention.
Figure 2:
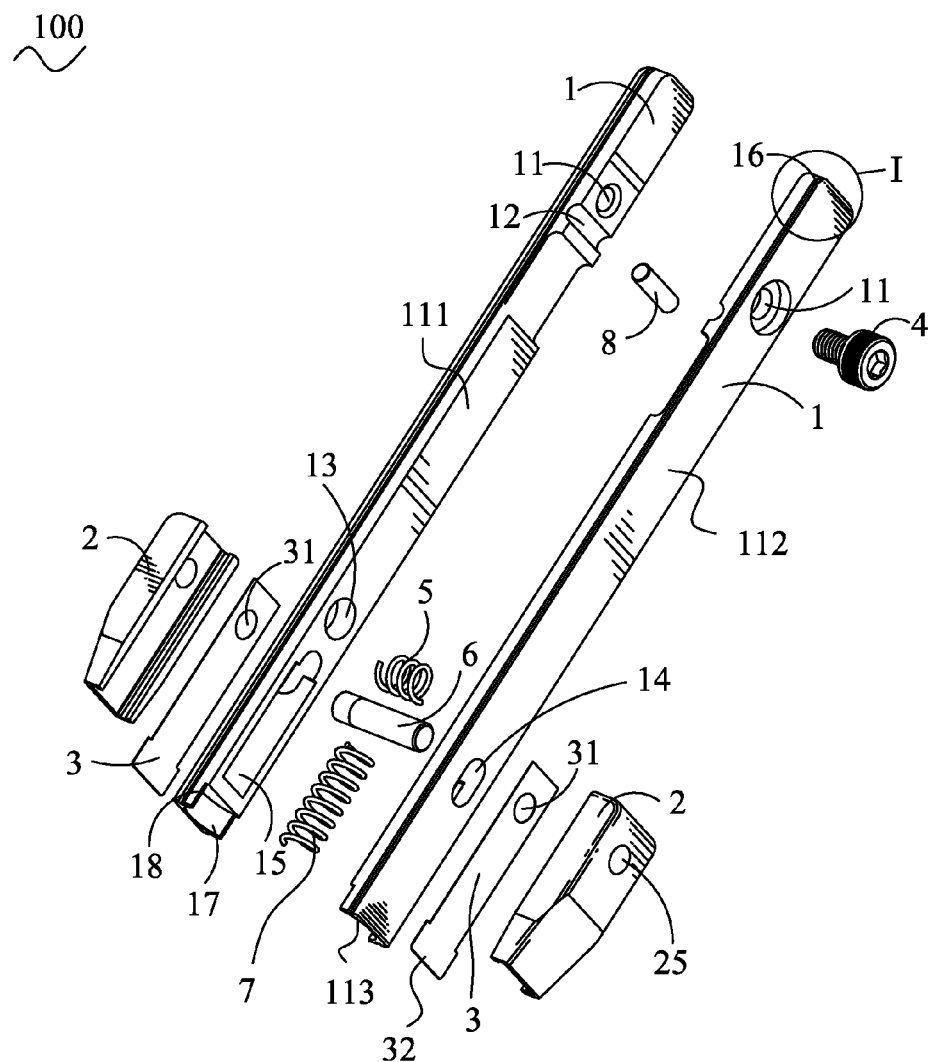
FIG. 2 is an exploded, perspective view of the clutching jig shown in FIG. 1.

Please refer to FIG. 1 and FIG. 2, a clutching jig 100 according to the present invention includes a pair of holding arms 1, a pair of sliding elements 2, two resisting pads 3, a fixing screw 4, a supporting spring 5, a connecting pole 6, an adjusting spring 7 and a locating pole 8.

Figure 3:
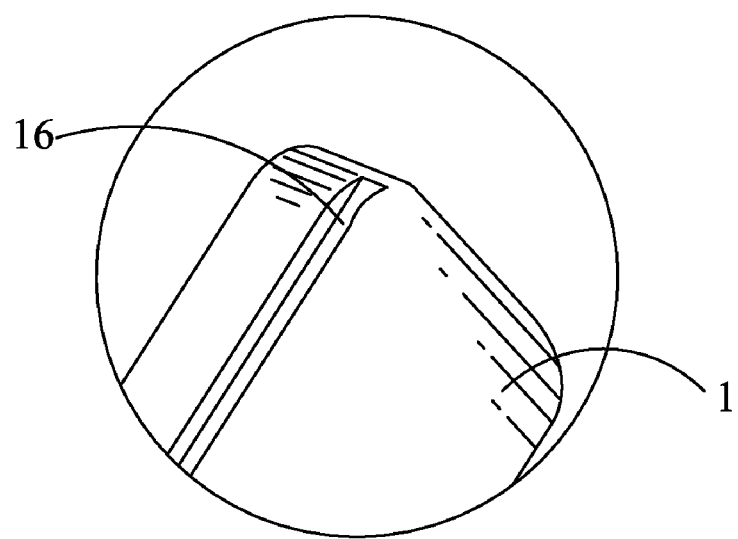
FIG. 3 is a partly enlarged view showing an enlarged portion of FIG. 2.

Please refer to FIGS. 1-3, the holding arms 1 are substantially bar-shaped and define two facing inner surfaces 111, two outer surfaces 112 opposite to the corresponding inner surfaces 111, and two lower surfaces 113 connecting with the inner surfaces 111 and the outer surfaces 112. Each of the inner surfaces 111 has a thread hole 11 at an upper end thereof and passing through the whole holding arm 1, for engaging with the fixing screw 4, and a locating groove 12 below the thread hole 11 and extending along a direction perpendicular to a lengthwise direction of the holding arm 1, for receiving the locating pole 8. A lower end of the inner surface 111 has a channel 15 which extends along the lengthwise direction of the holding arm 1 for receiving the adjusting spring 7, and a circular receiving hole 13 above the channel 15, for accommodating the supporting spring 5. A mounting hole 14 is formed between the channel 15 and the receiving hole 13 and communicates with the channel 15. The mounting hole 14 is substantially an ellipse shape, with a minor axis thereof perpendicular to the lengthwise direction of the holding arm 1, and passes through the outer surface 112 of the holding arm 14. A trough 17 is formed at the lower surface 113 and passes through the inner surface 111. The trough 17 has a half-circular cross section viewed from a lower direction, with two opposite free edges thereof concaved to form notches 18, for forming a positioning recess 181 when the holding arms 1 are connected together. Two opposite sides of the holding arm 1, different from the inner surface 111 and the outer surface 112, are respectively formed with a guiding slot 16. The guiding slots 16 extend along the lengthwise direction of the holding arm 1 and pass through the whole holding arm 1.

Figure 4:
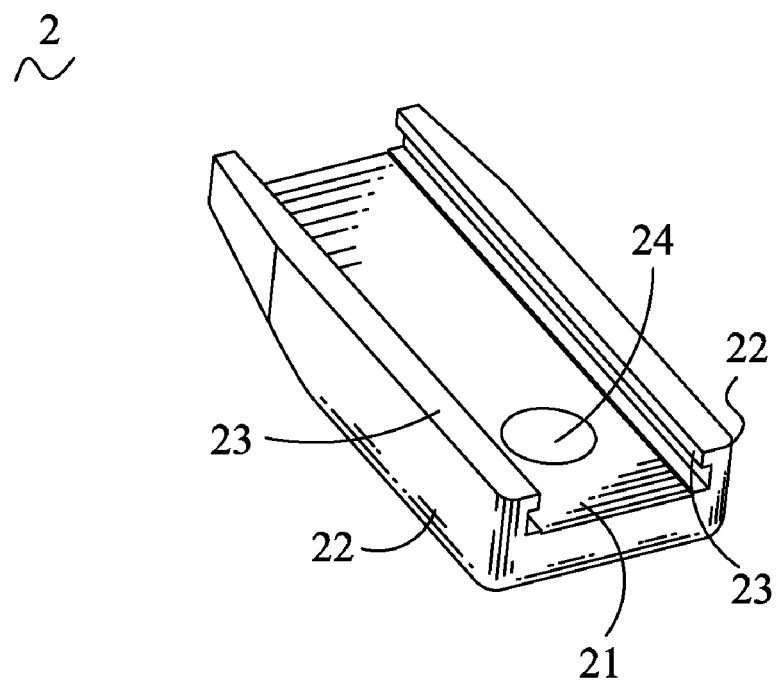
FIG. 4 is a perspective view of a sliding element of the clutching jig shown in FIG. 1.

Please refer to FIG. 2 and FIG. 4, the sliding element 2 has a rectangular basic plate 21, two lateral plates 22 extended perpendicularly from two opposite sides of the basic plate 21 and facing toward the same direction. The basic plate 21 has a through hole 24 at an upper portion thereof. The lateral plates 22 have free edges protruded toward each other to form rails 23, for sliding in the corresponding guiding slots 16. In this embodiment, lower portions of outer surfaces of the basic plate 21 and the lateral plates 22 are shaped with oblique surfaces, slanting toward each other. The resisting pad 3 is rectangular and sandwiched between the holding arm 1 and the sliding element 2, with a hole 31 formed at an upper portion thereof, corresponding to the through hole 24.

With reference to FIGS. 1-2 and FIG. 4, in assembly, the two holding arms 1 are connected together by the fixing screw 4 engaging with the thread holes 11. The locating grooves 12 face each other to form a columnar hole, where the locating pole 8 is located, for positioning the holding arms 1. The supporting spring 5 has two ends received in the receiving holes 13 and resting against bottoms of the receiving holes 13 to form an interstice 19 between the holding arms 1, thereby the two holding arms 1 capable of being held to approach each other with a distance to reduce a space formed by the troughs 17 for holding the lens body 302 tightly. The rails 23 of the sliding element 2 slide in the guiding slots 16, with the resisting pad 3 sandwiched between the basic plate 21 and the outer surface 112 of the holding arm 1. The connecting pole 6 is provided to pass through the through holes 24, holes 31 and the mounting holes 14 to secure the sliding elements 2 and the resisting pads 3 to the corresponding holding arms 1. The adjusting spring 7 is received in a space formed by the two facing channels 15, and has an end resting against the connecting pole 6 so that the connecting pole 6 is located at an upper end of the mounting hole 14, defined as a first position. At this time, a lower edge 32 of the resisting pad 3 is substantially flush with the lower surface 113 of the holding arm 1. Therefore, the resisting pad 3 is attached to holding arm 1 and protected by the holding arm 1 to prevent from being deformed under unexpected force.

Figure 5:
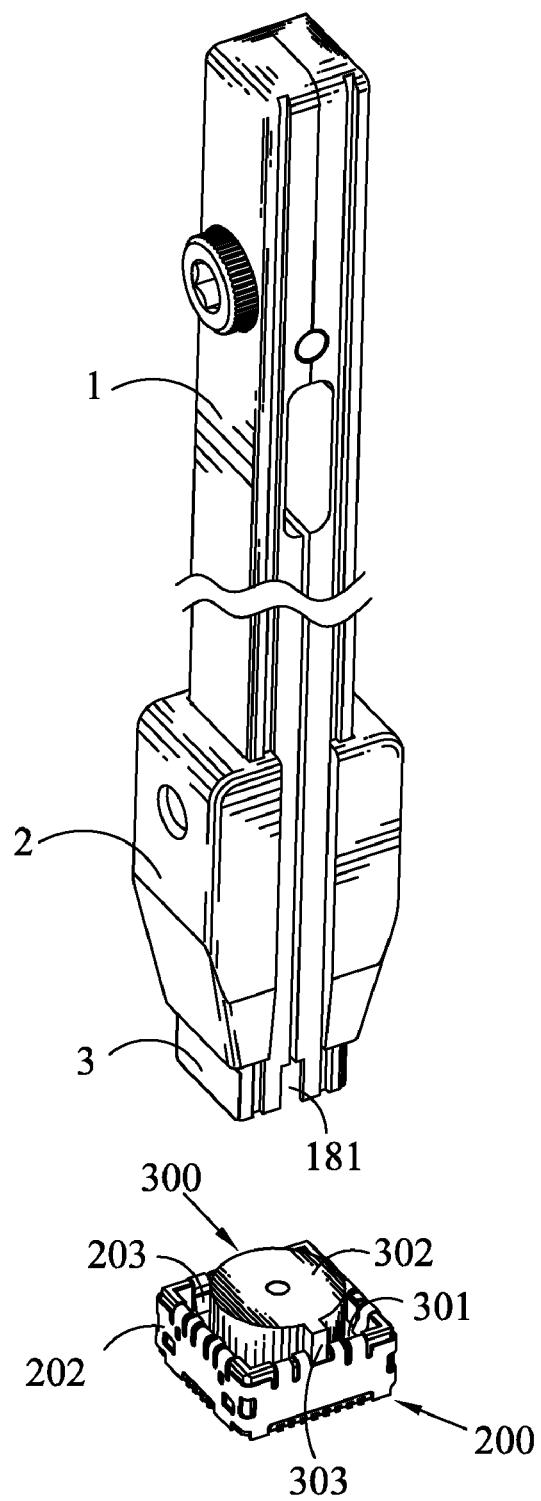
FIG. 5 is a plan view illustrating a state of the clutching jig used to disassemble a conventional lens module.
Figure 6:
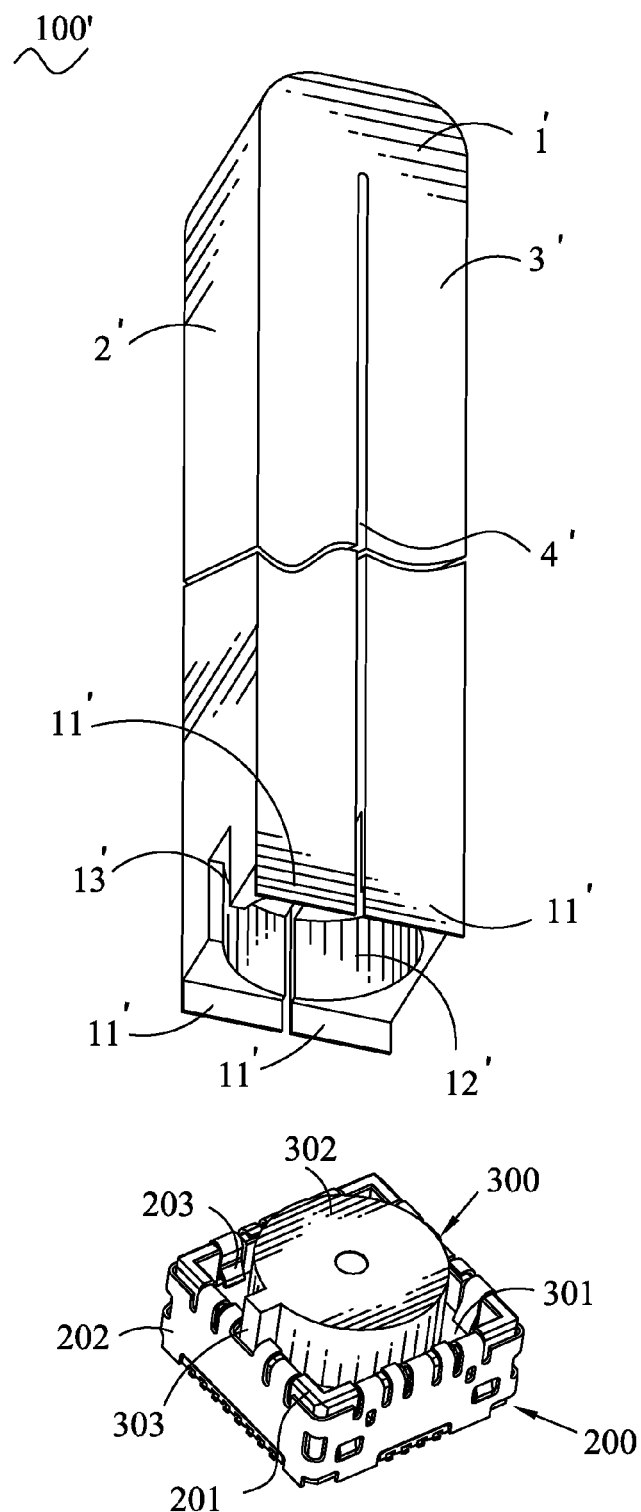
FIG. 6 is a perspective view of a clutching jig in prior art for disassembling the conventional lens module.

Referring to FIG. 2 and FIG. 5, when the clutching jig 100 is used to disassemble the conventional lens module, the positioning recess 181 is positioned and engaged with the fool-proof projection 303. The space surrounded by the two troughs 17 receives the lens body 302. The sliding elements 2 are moved downwards with respect to the holding arms 1 so that the lower edge 32 of the resisting pads 3 are brought to move downwards and insert into a space between the lens component 300 and the lens socket 200, pressing the buckling pieces 203 to disengage from the lens component 300, defined as a second position. At this time, the holding arms 1 can be urged to approach each other to hoop the lens body 302 tightly. Consequently, the lens component 300 is extracted from the lens socket 200 by lifting the clutching jig 100 upwards. The sliding elements 2 return to the original position under the resilient force of the adjusting spring 7 after disassembly.

As described above, when the clutching jig 100 is unused, the resisting pads 3 are attached to the holding arms 1, with the lower edges 32 unextended beyond the lower surfaces 113 of the holding arms 1, which is capable of preventing the resisting pads 3 from deforming in the action of the unexpected force. When the clutching jig 100 is in use, the resisting pads 3 are moved along the holding arms 1 to project beyond the lower surface 113 of the holding arms 1 with a short distance, which pushes the buckling piece 203 to depart from the lens component 300, but is not affected to deform by the force from the buckling pieces 203. Furthermore, the exposed portions of the resisting pads 3 are inserted between the insulating housing 201 and the lens base 301, which is effective to restrain the resisting pads 3 from deforming.

What is claimed is:

1. A clutching jig used to disassemble a lens socket and a lens component which is fixed in the lens socket by a plurality of buckling pieces of the lens socket abutting on the lens component, comprising:

a pair of holding arms defining two facing inner surfaces and two outer surfaces opposite to the corresponding inner surfaces, the holding arms having upper ends connected together, and lower ends spaced away from each other to form an interstice, each of the inner surfaces having a mounting hole of substantially ellipse shape reaching the outer surface, for allowing a connecting pole passing therethrough and moving therein, a trough being formed at a lower surface of each holding arm and passing through the corresponding inner surface, for surrounding a space to receive the lens component;

two sliding elements slidably mounted to the holding arms respectively, each of the sliding elements having a basic plate, the basic plate having a though hole at an upper portion thereof, for engaging with the connecting pole; and two resisting pads disposed between the outer surfaces of the holding arms and the basic plates, each of the resisting pads having a hole at an upper portion thereof, for engaging with the connecting pole;

wherein the sliding elements are located at a first position where lower edges of the resisting pads are substantially flush with the lower surfaces of the holding arms, and moved downwards to a second position with respect to the holding arms where the lower edges of the resisting pads project beyond the lower surfaces of the holding arms with a predetermined distance to insert a space between the lens component and the lens socket for pressing the buckling pieces to disengage from the lens component, wherein the inner surfaces have upper ends formed with thread holes, a fixing screw is adapted to pass through and engage with the thread holes for connecting the holding arms together, wherein the two inner surfaces have facing receiving holes above the corresponding mounting holes, a supporting spring has two opposite ends received in the receiving holes, and pushing the holding arms to depart from each other to form the interstice.

2. The clutching jig as claimed in claim 1, wherein each inner surface has a locating groove adjacent to the thread hole, the locating grooves face each other to form a columnar hole which receives a locating pole for positioning the two holding arms.

3. The clutching jig as claimed in claim 1, wherein two sides of each holding arm, different from the inner surface and the outer surface, are respectively formed with a guiding slot which extends a lengthwise direction of the holding arm, the sliding element has two facing lateral plates connected to two opposite sides of the basic plate, each of the lateral plates has a portion protruded inwards to form a rail for sliding in the guiding slot.

4. The clutching jig as claimed in claim 1, wherein each inner surface has a channel under the mounting hole, the channel extends parallel to a lengthwise direction of the holding arm and communicates with the mounting hole, the two channels face each other to form a space for receiving an adjusting spring, the adjusting spring has an end resting against the connecting pole for supporting the sliding element at the first position, and is compressed to make the sliding elements slide to the second position.

5. The clutching jig as claimed in claim 1, wherein each trough has two opposite free edges formed with notches, the facing notches surround a positioning recess for receiving a fool-proof projection of the lens component.

* * * * *